United States Patent
Abbott et al.

(10) Patent No.: US 11,193,184 B2
(45) Date of Patent: Dec. 7, 2021

(54) SYSTEM FOR USE IN PRODUCING A METAL ION SUSPENSION AND PROCESS OF USING SAME

(71) Applicant: CDA Research Group, Inc., Pittsburgh, PA (US)

(72) Inventors: Dominic C. Abbott, Pittsburgh, PA (US); ChunLim Abbott, Pittsburgh, PA (US)

(73) Assignee: CDA RESEARCH GROUP, INC., Pittsburgh, PA (US)

( * ) Notice: Subject to any disclaimer, the term of this patent is extended or adjusted under 35 U.S.C. 154(b) by 12 days.

(21) Appl. No.: 16/283,605

(22) Filed: Feb. 22, 2019

(65) Prior Publication Data

US 2020/0270723 A1  Aug. 27, 2020

(51) Int. Cl.
  *C22B 15/00* (2006.01)
  *C22B 3/22* (2006.01)
  *C22B 3/02* (2006.01)

(52) U.S. Cl.
  CPC ............ *C22B 15/0069* (2013.01); *C22B 3/02* (2013.01); *C22B 3/22* (2013.01); *C22B 15/0086* (2013.01); *C22B 15/0095* (2013.01)

(58) Field of Classification Search
  CPC ........ A61K 2300/00; A61K 9/06; A61K 9/08; A61K 33/34; A61K 31/30; A61K 2800/86; C22B 3/02; C22B 3/10; C22B 3/06

See application file for complete search history.

(56) References Cited

U.S. PATENT DOCUMENTS

| | | | |
|---|---|---|---|
| 2,994,642 A | 8/1961 | Francois | |
| 3,393,678 A | 7/1968 | Pacini | |
| 3,803,308 A | 4/1974 | Zipper | |
| 3,814,809 A | 6/1974 | Gordon | |

(Continued)

FOREIGN PATENT DOCUMENTS

| | | |
|---|---|---|
| AU | 040296/72 | 9/1973 |
| CA | 2478137 A1 | 2/2006 |

(Continued)

OTHER PUBLICATIONS

US 11,052,109 B2, 07/2021, Abbott et al. (withdrawn)

(Continued)

*Primary Examiner* — Stefanie J Cohen
(74) *Attorney, Agent, or Firm* — Wilmer Cutler Pickering Hale and Dorr LLP (57) ABSTRACT

Provided herein is a system for producing suspensions comprising soluble metal ions. The system comprises a basket to hold a metal load comprising a permeable floor so as to allow a solution to come into contact with the metal load. The system further comprises a vessel within which the solution and the basket may be maintained while metal ions are leached from the metal load into the solution. Some embodiments of the present disclosure pertain to a system used to produce a suspension comprising copper ions. Additionally, provided herein are methods of using the system to produce suspensions comprising soluble metal ions. Some embodiments of the present disclosure pertain to methods of making suspensions comprising copper ions. The resultant suspensions comprising metal ions may be further modified to supply a pharmaceutically acceptable treatment.

11 Claims, 4 Drawing Sheets

(56) References Cited

U.S. PATENT DOCUMENTS

| | | | |
|---|---|---|---|
| 3,930,834 A | 1/1976 | Schulteis et al. | |
| 3,934,580 A | 1/1976 | Cournut | |
| 4,039,406 A | 8/1977 | Stanley et al. | |
| 4,136,172 A | 1/1979 | Walliczek | |
| 4,242,192 A * | 12/1980 | Dunning, Jr. | C25C 7/007 204/212 |
| 4,246,896 A | 1/1981 | Horne, Jr. et al. | |
| 4,294,894 A | 10/1981 | Vellucci | |
| 4,332,791 A | 6/1982 | Raaf et al. | |
| 4,391,270 A | 7/1983 | Uragami | |
| 4,407,786 A | 10/1983 | Drake et al. | |
| 4,457,909 A | 7/1984 | Tames | |
| 4,618,489 A | 10/1986 | Pollock et al. | |
| 4,642,230 A | 2/1987 | Whitehead et al. | |
| 4,661,101 A | 4/1987 | Sustmann | |
| 4,675,014 A | 6/1987 | Sustmann et al. | |
| 4,680,309 A | 7/1987 | Maurer | |
| 4,795,628 A | 1/1989 | Afseth | |
| 4,959,216 A | 9/1990 | Daunter | |
| 5,037,634 A | 8/1991 | Williams et al. | |
| 5,063,065 A | 11/1991 | Bazterrica et al. | |
| 5,164,367 A | 11/1992 | Pickart | |
| 5,211,940 A | 5/1993 | Ishiguro et al. | |
| 5,389,360 A | 2/1995 | Mobley et al. | |
| 5,415,866 A | 5/1995 | Zook | |
| 5,425,862 A * | 6/1995 | Hartmann | C25D 7/0614 204/207 |
| 5,456,602 A | 10/1995 | Sakuma | |
| 5,458,746 A | 10/1995 | Burgess et al. | |
| 5,798,116 A | 8/1998 | Brown | |
| 5,981,475 A | 11/1999 | Reynolds | |
| 6,022,545 A | 2/2000 | Schmittmann et al. | |
| 6,042,848 A | 3/2000 | Lawyer et al. | |
| 6,087,549 A | 7/2000 | Flick | |
| 6,123,925 A | 9/2000 | Barry et al. | |
| 6,153,210 A | 11/2000 | Roberts et al. | |
| 6,231,889 B1 | 5/2001 | Richardson et al. | |
| 6,294,186 B1 | 9/2001 | Beerse et al. | |
| 6,319,391 B1 | 11/2001 | Holderness et al. | |
| 6,383,352 B1 * | 5/2002 | Shyu | C25D 7/12 204/280 |
| 7,005,556 B1 | 2/2006 | Becker et al. | |
| 7,087,249 B2 | 8/2006 | Burrell et al. | |
| 7,252,839 B2 | 8/2007 | Hallinen et al. | |
| 7,604,819 B2 | 10/2009 | Huey et al. | |
| 7,776,915 B2 | 8/2010 | Morariu | |
| 7,857,961 B2 * | 12/2010 | Hayashi | C25D 3/38 205/291 |
| 8,118,028 B2 | 2/2012 | Karpati | |
| 8,135,466 B2 | 3/2012 | Fuller et al. | |
| 8,182,800 B2 | 5/2012 | MacDonald | |
| 10,398,733 B2 | 9/2019 | Abbott et al. | |
| 11,000,545 B2 | 5/2021 | Abbott et al. | |
| 11,007,143 B2 | 5/2021 | Abbott et al. | |
| 2002/0114767 A1 | 8/2002 | Rolla | |
| 2002/0136758 A1 | 9/2002 | Jehan | |
| 2003/0099718 A1 | 5/2003 | Burrell et al. | |
| 2003/0163149 A1 | 8/2003 | Heisinger | |
| 2003/0166510 A1 | 9/2003 | Pickart | |
| 2004/0171519 A1 | 9/2004 | DiSpirito et al. | |
| 2004/0254097 A1 | 12/2004 | Patt | |
| 2005/0048007 A1 | 3/2005 | Ruggles | |
| 2005/0169852 A1 | 8/2005 | Roberge et al. | |
| 2006/0122095 A1 | 6/2006 | Delvin et al. | |
| 2006/0216258 A1 | 9/2006 | Singleton et al. | |
| 2006/0222622 A1 | 10/2006 | Faure | |
| 2006/0253078 A1 | 11/2006 | Wu et al. | |
| 2007/0014839 A1 | 1/2007 | Bracht | |
| 2007/0053849 A1 | 3/2007 | Doyle et al. | |
| 2007/0167971 A1 | 7/2007 | Huey et al. | |
| 2007/0187327 A1 | 8/2007 | George et al. | |
| 2007/0190175 A1 | 8/2007 | Cummins et al. | |
| 2007/0243263 A1 | 10/2007 | Trogolo | |
| 2007/0275073 A1 | 11/2007 | Huey et al. | |
| 2007/0276308 A1 | 11/2007 | Huey et al. | |
| 2008/0029915 A1 | 2/2008 | Waldron | |
| 2008/0032119 A1 | 2/2008 | Feldhahn et al. | |
| 2008/0081077 A1 | 4/2008 | Faryniarz et al. | |
| 2008/0125686 A1 | 5/2008 | Lo | |
| 2008/0195033 A1 | 8/2008 | Eagleson et al. | |
| 2008/0274065 A1 | 11/2008 | Robinson et al. | |
| 2008/0295843 A1 | 12/2008 | Haas | |
| 2008/0299155 A1 | 12/2008 | McCook et al. | |
| 2008/0311165 A1 | 12/2008 | Gabbay | |
| 2008/0311218 A1 | 12/2008 | Oronsky et al. | |
| 2008/0317836 A1 | 12/2008 | Dorogi et al. | |
| 2009/0004294 A1 | 1/2009 | Margulies et al. | |
| 2009/0018213 A1 | 1/2009 | Snyder et al. | |
| 2009/0148540 A1 | 6/2009 | Martin et al. | |
| 2009/0186071 A1 | 7/2009 | Huey et al. | |
| 2009/0246292 A1 | 10/2009 | Seville et al. | |
| 2009/0287131 A1 | 11/2009 | Neron et al. | |
| 2009/0304813 A1 | 12/2009 | Hickok | |
| 2009/0311305 A1 | 12/2009 | Abbott et al. | |
| 2010/0003198 A1 | 1/2010 | Stolmeier et al. | |
| 2010/0015898 A1 | 1/2010 | An et al. | |
| 2010/0068161 A1 | 3/2010 | Todary | |
| 2010/0068297 A1 | 3/2010 | Naughton | |
| 2010/0100188 A1 | 4/2010 | Fuller et al. | |
| 2010/0158989 A1 | 6/2010 | Mentkow et al. | |
| 2010/0228174 A1 | 9/2010 | Huey et al. | |
| 2010/0233248 A1 | 9/2010 | Huey et al. | |
| 2010/0307503 A1 | 12/2010 | Iwamoto et al. | |
| 2011/0064826 A1 | 3/2011 | Spurge | |
| 2011/0086088 A1 | 4/2011 | Berry | |
| 2011/0195108 A1 | 8/2011 | Fujimori et al. | |
| 2012/0063262 A1 | 3/2012 | Imran | |
| 2012/0071807 A1 | 3/2012 | McClure, Jr. | |
| 2012/0071858 A1 | 3/2012 | Abbott et al. | |
| 2012/0089068 A1 | 4/2012 | McClure, Jr. | |
| 2013/0123716 A1 | 5/2013 | Abbott et al. | |
| 2013/0226061 A1 | 8/2013 | Dickson | |
| 2014/0221948 A1 | 8/2014 | Riesinger | |
| 2014/0271495 A1 | 9/2014 | Abbott et al. | |
| 2014/0271797 A1 * | 9/2014 | Abbott | A61L 26/0066 424/445 |
| 2014/0271798 A1 | 9/2014 | Abbott et al. | |
| 2014/0271919 A1 | 9/2014 | Abbott et al. | |
| 2016/0008272 A1 | 1/2016 | Abbott et al. | |
| 2017/0000823 A1 | 1/2017 | Abbott et al. | |
| 2017/0101699 A1 | 4/2017 | Moskovchenko et al. | |
| 2018/0071206 A1 | 3/2018 | Abbott et al. | |
| 2018/0133250 A1 * | 5/2018 | Abbott | A61K 9/12 |
| 2019/0343876 A1 | 11/2019 | Abbott et al. | |
| 2020/0206264 A1 | 7/2020 | Abbott et al. | |
| 2020/0281972 A1 | 9/2020 | Abbott et al. | |

FOREIGN PATENT DOCUMENTS

| | | |
|---|---|---|
| CN | 101203232 A | 6/2008 |
| CN | 101534823 A | 9/2009 |
| EP | 0115130 B1 | 1/1987 |
| EP | 1236461 A1 | 9/2002 |
| EP | 2762125 B1 | 8/2016 |
| FR | 2751544 A1 | 1/1998 |
| GB | 521215 A | 5/1940 |
| GB | 1333906 A | 10/1973 |
| GB | 1493750 A | 11/1977 |
| GB | 2449893 A | 12/2008 |
| JP | 2003212765 A | 7/2003 |
| RU | 2051154 C1 | 12/1995 |
| RU | 2155047 C1 | 8/2000 |
| SU | 1538101 | 1/1990 |
| WO | WO-9215329 A1 | 9/1992 |
| WO | WO-9958095 A2 | 11/1999 |
| WO | WO-2001026665 A1 | 4/2001 |
| WO | WO-0239963 A1 | 5/2002 |
| WO | WO-0241862 A1 | 5/2002 |
| WO | WO-02096202 A1 | 12/2002 |
| WO | WO-2004073758 A1 | 9/2004 |
| WO | WO-2005072691 A1 | 8/2005 |
| WO | WO-2006096937 A1 | 9/2006 |
| WO | WO-2008037262 A1 | 4/2008 |
| WO | WO-2009088270 | 7/2009 |

(56) References Cited

FOREIGN PATENT DOCUMENTS

| | | |
|---|---|---|
| WO | WO-2011069184 A1 | 6/2011 |
| WO | WO-2012063262 A2 | 5/2012 |
| WO | WO-2018052995 | 3/2018 |
| WO | WO-2020171994 | 8/2020 |

OTHER PUBLICATIONS

Zwirner [Advantages of Vertical Storage Tanks, 2014] https://www.zwirnerequipment.com/blog/5-advantages-vertical-storage-tanks/ (Year: 2014).*
Azo Materials [Medic https://www.azom.com/article.aspx? ArticleID=6641 aI Applications of Stainless Steel, 2012] (Year: 2012).*
"Copper Sulfate", extract from Extoxnet: Extension Toxicology Network, <http://pmep.cce.cornell.edu/profiles/extoxnet/carbaryl-dicrotophos/copper-sulfate-ext.html>, May 1994 (2 pages).
"Copper Sulphate's Role in Agriculture", Excerpt from PAN Pesticides Database—Chemicals (1 page).
"Dangers of Copper Compounds (Sulfate, etc.)", Pubchem.ncbi.nlm.nih.gov/compound/Copper_sulfate#section=Top, 2007 (17 pages).
Blakley, B.R. "Overview of Copper Poisoning", Merck Manual: Veterinary Manual, https://www.merckvetmanual.com/toxicology/copper-poisoning/overview-of-copper-poisoning, 2018 (3 pages).
Copper Gluconate, except from Wikipedia, https://en.wikipedia.org/wiki/Copper_gluconate, Mar. 29, 2017 (1 page).
Wikipedia, "Acetic acid", https://en.wikipedia.org/wiki/Acetic_acid, Oct. 14, 2019 (19 pages).
Wikipedia, "Copper(I) chloride", https://en.wikipedia.org/wiki/Copper(I)_chloride, accessed Oct. 13, 2019 (8 pages).
Wikipedia, "Salt (chemistry)", https://en.wikipedia.org/wiki/Salt_(chemistry), accessed Oct. 14, 2019 (6 pages).
Wikipedia, "Suspension (chemistry)", https://en.wikipedia.org/wiki/Suspension_(chemistry), accessed Oct. 13, 2019 (3 pages).
Collins, Reflections of Dentifrice Ingredients, Benefits and Recommendations: A Peer-Reviewed Publication, www.ineedce.com, accessed https://www.dentalacademyofce.com/courses/2086/pdf/1103cei_dentifrices_web.pdf, Oct. 2009 (11 pages).
Dragani, R. "Does Salt Change the pH of Water?", https://sciencing.com/does-salt-change-ph-water-4577912.html., downloaded Dec. 31, 2019, Apr. 19, 2018 (3 pages).
European Extended Search Report issued in European Patent Application No. EP20161252.0, dated Jun. 17, 2020 (9 pages).
European Partial Supplementary Search Report issued in EP17851454.3, dated Apr. 6, 2020 (14 pages).
Khaled, K.F., "Studies of the corrosion inhibition of copper in sodium chloride solutions using chemical and electrochemical measurements", Materials Chemistry and Physics, 125:427-433, 2011 (7 pages).
Malik, R. "Warm Saline Rinses", http://www.nature.com/articles/sj.bdj.2009.1093.pdf, accessed Dec. 31, 2019, Br. Dental J., 207(11):520, 2009 (2 page).
Saxer, U P et al., "New Studies on Estimated and Actual Toothbrushing Times and Dentifrice Use", J. Clin. Dent., 9(2):49-51, 1998 (1 page)—Abstract Only.
Shackel, N.A. et al., "Copper-salicylate gel for pain relief in osteoarthritis: a randomised controlled trial", MJA, 167:134-136, Aug. 4, 1997 (3 pages).
Tamba, B.I. et al., "Common Trace Elements Alleviate Pain in an Experimental Mouse Model", Journal of Neuroscience Research, 91:554-561, 2013 (8 pages).
VersaBase Cream, Product Information Document, from PCCA, https://pccarx.com/Products/ProductCatalog?pid=30-3641, accessed Dec. 31, 2019 (4 pages).
Yassin, N. et al., "Effect of a topical copper indomethacin gel on inflammatory parameters in a rat model of osteoarthritis", Drug Design, Development and Therapy, 9:1491-1498, 2015 (8 pages).
"Difference Between 304 vs 316 Stainless Steel", Eagle Stainless Tube & Fabrication, Inc., https://eagletube.com/about-us/news/304-vs-316-stainless-steel, Jun. 21, 2018 (2 pages).
Duguid, R., "Copper-inhibition of the growth of oral Streptococci and actinomyces", Biomaterials, 4:225-227, Jul. 1983 (3 pages).
European Extended Search Report, issued in European Patent Application No. 17851454.3, dated Jul. 10, 2020 (15 pages).
International Search Report and Written Opinion issued by the U.S. Patent and Trademark Office as International Searching Authority, issued in International Application No. PCT/US20/17454, dated Jun. 23, 2020 (12 pages).
Maltz, M. et al., "Effect of copper fluoride and copper sulfate on dental plaque, Streptococcus mutans and caries in hamsters", Scand. J. Dent. Res., 96:390-392, Oct. 1, 1988 (3 pages).
Moore, R.L. et al., "Evaluating the Anti-Plaque Capabilities of a Copper-Containing Prophylaxis Paste", J. Periodontal., 60(2):78-80, Feb. 1989 (3 pages).
Mulligan, A.M. et al., "The effect of increasing copper content in phosphate-based glasses on biofilms of Streptococcus sanguis", Biomaterials, 24:1797-1807, 2003 (11 pages).
"Assessment of the Safety and Efficacy of 3VM1001 Cream for Treatment of Chronic Pain Caused by Knee Osteoarthritis", ClinicalTrials.gov, https://clinicaltrials.gov/ct2/history/NCT02332148?V_3, dated Aug. 19, 2015 (6 pages).
"Lowering Infection Rates in Hospitals and Healthcare Facilities—The Role of Copper Alloys in Battling Infectious Organisms", Copper, BioHealth Partnership Publication, Edition 1, Mar. 2007, 26 pages.
"New Molecular Test Available to Diagnose Trichomonas Vaginalis in Asymptomatic and Symptomatic Females", PR Newswire, Oct. 18, 2012, 3 pages.
"Visual Analogue Scale", https://web.archive.org/web/20150804080655/ https://www.physio-pedia.com/Visual_Analogue_Scale, Aug. 4, 2015, accessed Dec. 13, 2017 (6 pages).
"WOMAC Osteoarthritis Index," https://web.archive.org/web/20150907191904/https://www.physio-pedia.com/WOMAC_Osteoarthritis_Index, Sep. 7, 2015, accessed Dec. 13, 2017 (4 pages).
Amazon.com search for "Mouthwash", https://www.amazon.com/s/ref=sr_nr_n_0?fst=p90x%3A1%2Cas%3Aoff&rh=n%3A3760911%2Cn%3A10079992011%2Cn%3A3778161%2Ck%3Amouthwash&keywords=mouthwash&ie=UTF8&qid=1502940655&rnid=11055981, dated Aug. 16, 2017 (11 pages).
Anthoni, J.F., "The Chemical Composition of Seawater", http://www.seafriends.org.nz/oceano/seawater.htm, accessed Jul. 28, 2016 (10 pages).
ASTM International, Designation: D1688-12, "Standard Test Methods for Copper in Water", dated 2012, accessed Oct. 24, 2018 (10 pages).
Borkow, G. et al., "Copper as a Biocidal Tool", Current Medicinal Chemistry, 12:2163-2175 (2005) (13 pages).
Cao, "Man Sperm Self Report", Harbin Publishing House, p. 27, Mar. 2012 (2 pages)—with English Translation.
CDA Research Group, Inc., "Assessment of the Safety and Efficacy of 3VM1001 Cream for Treatment of Chronic Pain Caused by Knee Osteoarthritis", U.S. National Library of Medicine, Clinical Trial NCT02332148, https://clinicaltrials.gov/ct2/show/NCT02332148, Aug. 21, 2015, accessed Dec. 12, 2017 (5 pages).
Centers for Disease Control, "CDC No Longer Recommends Oral Drug for Gonorrhea Treatment", Press Release, Aug. 9, 2012, 1 page.
Centers for Disease Control. "Pelvic Inflammatory Disease (PID)", CDC Fact Sheet, Dec. 12, 2012, (6 pages).
Copper Glycinate Product Data Sheet, https://www.lookchem.com/Copper-glycinate/, dated 2008, accessed Aug. 30, 2018 (2 pages).
Database WPI, Week 199640, Thompson Scientific, London GB, AN 1996-400647, XP002765918, 1996 (2 pages).
Database WPI, Week 200375, Thompson Scientific, AN 2003-793474, XP002767346, 2003 (2 pages).
Dispose—definition, https://www.merriam-webster.com/dictionary/dispose, downloaded Jun. 24, 2018 (1 page).
Edematous—Definition from the Medical Dictionary of the Free Dictionary Online, https://medical-dictionary.thefreedictionary.com/edematous, accessed Mar. 7, 2018 (7 pages).
European Extended Search Report issued in EP14767396.6, dated Feb. 9, 2017 (10 pages).

(56) References Cited

OTHER PUBLICATIONS

European Extended Search Report issued in EP14768757.8, dated Dec. 6, 2016 (9 pages).
European Extended Search Report issued in EP14768896.4, dated Feb. 27, 2017 (8 pages).
Extended European Search Report issued in EP14767738.9, dated Jan. 2, 2017 (8 pages).
Faltermeier, R.B., "The Evaluation of Corrosion Inhibitors for Application to Copper and Copper Alloy Archaeological Artefacts", Thesis Submitted for the Degree of Doctor of Philosophy in the Faculty of Science of the University of London, Department of Conservation and Museum Studies, Institute of Archaeology, University College London, University of London, Jul. 1995 (332 pages).
Gerasimov, V.V. et al., "Effect of Temperature on the Rate of Corrosion of Metals", Russian Chemical Bulleting, pp. 1192-1197, Oct. 6, 1957 (6 pages).
Higdon, J. et al., "Copper", Linus Pauling Institute, Oregon State University, Apr. 2003, 8 pages.
International Search Report and Written Opinion issued by U.S. Patent and Trademark Office as International Searching Authority, in International Application No. PCT/US17/51356, Jan. 18, 2018 (11 pages).
Ion, Wikipedia, https://en.wikipedia.org/wiki/Ion, accessed Aug. 30, 2018 (11 pages).
Kirkpatrick, K., "Does saltwater work as mouthwash?", http://health.howstuffworks.com/wellness/oral-care/products/saltwater-as-mouthwash.htm, available online Sep. 18, 2011, accessed Mar. 4, 2019 (6 pages).
Lindeburg, M.R., Chemical Engineering Reference Manual for the PE Exam, Seventh Edition, Professional Publications, Inc., Belmont, California, p. 20-10, 2013 (3 pages).
Marques, M.R.C. et al., "Simulated Biological Fluids with Possible Application in Dissolution Testing", Dissolution Technologies, 18(3):15-28, Aug. 2011 (14 pages).
Metikoš-Hukovic, M. et al., "Copper Corrosion at Various pH Values with and without the Inhibitor", Journal of Applied Electrochemistry, 30:617-624, 2000 (8 pages).
Michels, H.T. et al., "Copper Alloys for Human Infectious Disease Control", presented at Materials Science and Technology Conference, Pittsburgh, PA, Copper for the 21st Century Symposium, Sep. 25-28, 2005, (11 pages).
Nkonzo, "Antimicrobial Copper", International Copper Association, Copper Development Association, May 5, 2010, 6 pages.
Owen, D.H. et al., "A Vaginal Fluid Simulant", Contraception, 59(2):91-95, Feb. 1999 (5 pages).
Perrie, Y. et al., "Chapter 1: Controlling Drug Delivery", *FASTtrack: Pharmaceutics—Drug Delivery and Targeting*, Second Edition, Sample Chapter, Jun. 2012 (26 pages).
Ramachandran, S. et al., "Gluconic Acid: Properties, Applications and Microbial Production", Food Technol. Biotechnol., 44(2):185-195, 2006 (11 pages).
Roldan, S, et al., "Biofilms and the tongue: therapeutical approaches for the control of halitosis", Clin. Oral Invest., 7:189-197, 2003 (9 pages).
Rosenhein, L.D., "The Household Chemistry of Cleaning Pennies", Applications and Analogies, Journal of Chemical Education, 78(4):513-515, Apr. 2001 (3 pages).
Sawyer, D.T., "Metal-Gluconate Complexes", Chem. Rev., 64(6):633-643, 1964 (11 pages).
Solioz, "Dry Copper Kills Bacteria on Contact", Science Daily, Feb. 22, 2011, (4 pages).
Stein, R., "Gonorrhea Evades Antibiotics, Leaving Only One Drug to Treat Disease", www.npr.org/blogs/health, Aug. 10, 2012, 5 pages.
Wang, et al., "Family Planning Technology", Shanghai Science and Technology Press, p. 334, Dec. 31, 1997 (2 pages)—English Excerpt.
Wikipedia, "Buffer Solution", Wikipedia, the Free Encyclopedia, https://en.wikipedia.org/wiki/Buffer_Solution, accessed Apr. 7, 2017 (8 pages).
Zatcoff, R.C. et al., "Treatment of tinea pedis with socks containing copper-oxide impregnated fibers", The Foot, 18:136-141 (2008) (6 pages).
Biocompatible, definition from Cambridge Dictionary, URL <https://dictionary.cambridge.org/US/dictionary/english/biocompatible>, 2020 (6 pages).
Iqbal, K. et al., "Role of Different Ingredients of Tooth Pastes and Mouthwashes in Oral Health", Journal of Pakistan Dental Association, 20(03):163-170, Jul.-Sep. 2011 (8 pages).
Wikipedia, "Saline (medicine)", URL <https://en.wikipedia.org/wiki/Saline (medicine)>, 2021 (9 pages).
"10 Homemade Gargles That Heal", Reader's Digest of Canada, www.readersdigest.ca/health/conditions/gaggle-gargles/, Jan. 4, 2008 (3 pages).
"Antimicrobial Copper FAQs", CDA Publication 201, Copper Development Association, Hemel Hempstead, United Kingdom, 2010 (8 pages).
"Buffer Reference Center", https://www.sigmaaldrich.com/life-science/core-bioreagents/biological-buffers/learning-center/buffer-reference-center.html, Oct. 26, 2008 (6 pages).
Al-Kharafi, et al., "Selective dissolution of brass in salt water", Journal of Applied Electrochemistry, 34:47-53, 2004 (7 pages).
Bauer, "Understanding radiation dermatitis", American Nurse Today, 11 (1):Jan. 13-15, 2016 (3 pages).
Bauer, "Understanding radiation dermatitis", URL<http://old.woundcareadvisor.com/understanding-radiation-dermatitis/>, Wound Care Advisor, vol. 5, No. 3, May/Jun. 2016 (6 pages).
Beigel, J.H. et al., "Remdesivir for the Treatment of Covid-19—Final Report", The New England Journal of Medicine, 383(19):1813-1826, published online Oct. 9, 2020 (14 pages).
Ben-Hur, et al., "Phosphorus Burns: The Antidote: A New Approach", British Journal of Plastic Surgery, 25:245-249, 1972 (5 pages).
Bianchetti, M. G., et al., "Body fluids and salt metabolism—Part I", Italian Journal of Pediatrics, 35:36, Nov. 19, 2009 (6 pages).
Blanc, C. et al., "Galvanic coupling between copper and aluminium in a thin-layer cell", Corrosion Science, 52(3):991-995, 2010 (6 Pages).
Cancer Facts & Figures 2016, American Cancer Society, URL <https://www.cancer.org/research/cancer-facts-statistics/all-cancer-facts-figures/cancer-facts-figures-2016.html>, 2016 (72 pages).
CDA Research Group, Inc., "A Double-Blind, Placebo-Controlled, Crossover Study to Evaluate the Efficacy and Tolerability of 3VM1001 Cream for the Treatment of Pain Associated With Post-Herpetic Neuralgia: A Proof of Concept Study", Identifier NCT03421613, published on clinicaltrials.gov <URL: https://www.clinicaltrials.gov/ct2/show/NCT03421613>, published Jul. 10, 2018 (8 pages).
CDA Research Group, Inc., "A Double-blind, Placebo-controlled, Randomized Study to Assess the Safety and Efficacy of 3VM1001 Cream for the Treatment of Chronic Pain Caused by Osteoarthritis of the Knee: A Proof of Concept Study", Identifier: NCT02332148, Published on ClinicalTrials.Gov, <URL: https://clinicaltrials.gov/ct2/show/NCT02332148>, Published Aug. 21, 2015 according to ClinicalTrials.Gov (6 pages).
CDA Research Group, Inc., "A Double-Blind, Placebo-Controlled, Randomized Study to Evaluate the Safety and Efficacy of 3VM1001 Cream for the Treatment of Chronic Pain Caused by Osteoarthritis of the Knee: A Dose Ranging Study", Identifier: NCT03142178 published on clinicaltrials.gov <URL: https://www.clinicaltrials.gov/ct2/show/ NCT03142178 >, published Jul. 6, 2018 according to ClinicalTrials.Gov (9 pages).
Cortes, A. A. et al., "The use of copper to help prevent transmission of SARS-coronavirus and influenza viruses. A general review", Diagnostic Microbiology and Infectious Disease, 98:115176, available online Aug. 15, 2020 (5 pages).
De Rauglaudre, G. et al., "Tolerance of the association sucralfate / Cu—Zn salts in radiation dermatitis", Annales de dermatologie, 1:11-15 (2008)—English Abstract (5 pages).
European Extended Search Report issued in EP20185469.2, dated Oct. 9, 2020 (10 pages).
Fenelon, A.M. et al., "The electrochemical synthesis of polypyrrole at a copper electrode: corrosion protection properties", Electrochimica Acta, 47:4467-4476, 2002 (10 pages).

(56) References Cited

OTHER PUBLICATIONS

Google Search "Copper Salt for Sore Throat 'Coronavirus'", URL https://www.google.com/search?source=hp&ei=YhxEX5fdBvOuytMPmca9cAo&q=coppe . . . >, dated Aug. 24, 2020 (2 pages).

Google Search, "copper in sea salt", URL <https://www.google.com/search?q=copper+in+sea+salt&ei=TRrWYJyaCemr5NoPvlmPIA . . . , Jun. 25, 2021 (2 pages).

Google Search, "dead sea salt and acetate buffer mouthwash", URL <https://www.google.com/search?q=dead+sea+salt+and+acetate+buffer+mouthwash&ei=d . . . , Jun. 25, 2021 (2 pages).

Google Search, "Mouthwash dead sea salt and acetate buffer", URL <https://google.com/search?q=mouthwash+dead+sea+salt+and+acetate+buffer&tbm=. . . >, dated Jun. 25, 2021 (2 pages).

Gray, L.W. et al., "Urinary Copper Elevation in a Mouse Model of Wilson's Disease Is a Regulated Process to Specifically Decrease the Hepatic Copper Load", PLoS One, 7(6):e38327, Jun. 22, 2012 (11 pages).

International Search Report and Written Opinion issued by the U.S. Patent and Trademark Office as International Searching Authority, in International Application No. PCT/US21/24555, dated Jul. 8, 2021 (9 pages).

Read, A.J., "Dissolution of Copper in Weakly Acidic Solutions", The Journal of Physical Chemistry, 76(24):3656-3663, 1972 (8 pages).

Robinson, J., "No improvement in mortality rates for COVID-19 patients treated with remdesivir", the Pharmaceutical Journal, DOI:10.1211/PJ.2020.20208045, published online Jun. 8, 2020 (3 pages).

Wong, R. K. S. et al., "Clinical practice guidelines for the prevention and treatment of acute and late radiation reactions from the MASCC Skin Toxicity Study Group", Support Care Cancer, DOI 10.1007/S00520-013-1896-2, published online Aug. 14, 2013 (16 pages).

\* cited by examiner

SYSTEM FOR USE IN PRODUCING A METAL ION SUSPENSION AND PROCESS OF USING SAME

RELATED APPLICATIONS

The present patent application incorporates-by-reference U.S. patent application Ser. No. 13/841,882, titled "Topical Copper Ion Treatments and Methods of Treatment Using Topical Copper Ion Treatments in the Genital-Rectal Areas of the Body;" Ser. No. 13/841,992, titled "Topical Copper Ion Treatments and Methods of Making Topical Copper Ion Treatments for Use in Various Anatomical Areas of the Body;" Ser. No. 13/842,387, titled "Topical Copper Ion Treatments and Methods of Treatment Using Topical Copper Ion Treatments in the Dermatological Areas of the Body;" Ser. No. 14/168,310, titled "Therapeutic Wound Dressing with Solid Copper Material;" Ser. No. 09/336,724, now U.S. Pat. No. 6,190,365, titled "Vaginal douche applicator and method of vaginal deodorization using the same;" Ser. No. 10/077,256, now U.S. Pat. No. 6,589,216, titled "Vaginal douches, vaginal douche applicators and methods of vaginal douching;" Ser. No. 10/371,395, now U.S. Pat. No. 7,276,056, titled "Methods of treating abnormal biological conditions by vaginal douching;" Ser. No. 10/847,299, now U.S. Pat. No. 7,270,653, titled "Methods of treating abnormal biological conditions using metal oxides;" Ser. No. 11/810,685, now U.S. Pat. No. 8,118,789, titled "Deodorizer devices, systems and methods for controlling perspiration-related body odor;" Ser. No. 13/116,334, now U.S. Pat. No. 8,178,039, titled "Methods for controlling perspiration-related body odor;" Ser. No. 13/842,310, titled "Topical Copper Ion Treatments and Methods of Treatment Using Topical Copper Ion Treatments in the Oral-Respiratory-Otic Areas of the Body;" and Ser. No. 15/265,570, titled "Methods of Treatment Using Topical Copper Ion Formulations;" International Patent Application Publication Nos. WO 2014/150703, titled "Topical copper ion treatments in the genital-rectal areas of the body;" WO 2014/151350, titled "Topical copper ion treatments and methods of making topical copper ion treatments for use in various anatomical areas of the body;" WO 2014/150719, titled "Topical copper ion treatments in the dermatological areas of the body;" WO 2015/116520, titled "Therapeutic wound dressing with solid copper material;" WO 03/070301, titled "Vaginal douches, vaginal douche applicators and methods of vaginal douching;" WO 2014/150716, titled "Topical copper ion treatments;" and WO 2018/052995, titled "Methods of treatment using topical copper ion formulations," in their entireties.

TECHNICAL FIELD

The present disclosure pertains generally to a system for producing a suspension comprising metal ions as well as methods of using the system to produce a suspension comprising metal ions. The present disclosure pertains to the system and the methods of using the system where the suspension comprises copper ions.

BACKGROUND OF THE DISCLOSURE

Suspensions comprising metal ions are known to be useful in the making of pharmaceutical treatments for various conditions. For example, suspensions comprising copper ions are known to be treatments for conditions including but not limited to vaginitis, bacterial vaginosis, hemorrhoids, vaginal dryness, imbalances in vaginal pH, bacterial infections caused by gonorrhea, chlamydia, *streptococcus, staphylococcus, enterobacter, E. coli* and pseudomonas, protozoan infections caused by trichomonas, pelvic inflammatory disease, viral infections caused by shingles and the associated postherpetic neuralgia (PHN) (a chronic, painful condition that can follow shingles), herpes (I and II), HPV and HIV, fungal infections caused by yeast candida, thrush and other fungi, and causing conditions such as athlete's foot, ringworm and toenail fungus, impetigo, rosacea, psoriasis, eczema, warts, sun/wind damage, dry skin, age spots, pigmentation, scarring, blisters, boils, cysts, pimples, cuts, scratches, burns, abrasions, splinters, insect bites and stings, animal bites and scratches, ulcers, loss of elasticity or collagen, wrinkles, sagging skin, acne, measles, chicken pox, exposure to sexually transmitted diseases, the risk of undesired pregnancy (contraception), canker sores, mouth sores, mouth ulcers, colds, sinusitis, rhinosinusitis, sore throat, nasal discharge, congestion, runny nose, bronchitis, allergies, asthma, tonsillitis, wheezing, sneezing, ear infections, earache, pressure in the ears, cough, hoarseness, laryngitis, sore gums, periodontal disease, bad breath, tooth decay, plaque, biofilm, and the presence of pathogens and microbes on the skin that is an inevitable consequence of daily life. Thus, it is desirable for a safe and efficient method to provide suspensions comprising metal ions.

Existing methods of producing metal ion suspensions include dissolving metal salts such as copper sulfate into a solvent. However, metal salts may be made using harsh chemicals. For example, copper sulfate may be produced by treating copper metal with hot concentrated sulfuric acid or, alternatively, by treating copper oxides with dilute sulfuric acid. The use of such methods may introduce residual reactants, such as sulfuric acid, which may be an irritant or even potentially dangerous to a person. Additionally, solvents into which metal salts, such as copper sulfate, are dissolved will necessarily comprise the anionic molecule or molecules of the salt, for example sulfate in the case of copper sulfate. It is possible that the anionic molecules of a metal salt are themselves an irritant or reactive. Thus, it is desirable to control the composition of the final suspension comprising metal ions to a degree unavailable through the dissolving of metal salts into a solution.

Existing methods of ionizing a large mass of metal involve contacting a large mass of metal with a solvent to leach metal ions into the solution. However, many conventional methods are slowed by insufficient surface area contact between the metal and the solution. Thus, it is difficult for these methods to obtain sufficient ionization to be practical in producing large volumes of suspension comprising sufficiently high concentrations of metal ions.

SUMMARY OF THE DISCLOSURE

Disclosed herein are systems and methods for producing a suspension comprising metal ions.

Accordingly, in one aspect described herein, the system comprises a basket, a vessel, and a solution, wherein the solution is placed in the vessel, and the basket is loaded with solid metal. The basket may then be inserted into the vessel such that the metal load contained in the basket is fully or partially submerged in the solution, thereby allowing for metal ions to be leached out of the solid metal load and into the solution.

In some embodiments, the basket of the system comprises a permeable floor so as to allow a solution to come into contact with the metal load. In some embodiments, the basket and its metal load are fully submerged in the solution.

In some embodiments, the basket and its metal load are only partially submerged in the solution.

In some embodiments of the system, the basket and vessel are cylindrical. In some embodiments, the basket and the vessel are composed of plastic, glass, cloth, inert metals, or stainless steel that do not substantially react with the solution placed in the vessel. In some embodiments, the basket or the vessel is composed of medical grade stainless steel, such as 316 stainless steel.

In some embodiments, the basket of the system comprises one or more spacers to separate individual pieces of the metal load to increase the metal-surface-to-solution contact. In certain embodiments the more than one spacers run from end-to-end of the basket and do not intersect.

In some embodiments, the vessel may have a flat bottom. In some embodiments, the vessel may have a rounded bottom. In some embodiments, the vessel may have an open top. In some embodiments, the vessel may have a lid, or the top may be otherwise sealable.

In some embodiments, the solution is buffered. In some embodiments, the buffer comprises at least one of acetate, acetic acid, phosphate, a phosphoric acid, or at least one salt of acetate, acetic acid, phosphate, or phosphoric acid. In some embodiments, the solution is a saline solution.

In some embodiments, the system further comprises a temperature control element to heat, cool, or maintain steady the temperature of the system. In some embodiments, the system further comprises an agitation element to agitate at least one of the basket, the vessel, and the solution.

In another aspect described herein, the method comprises loading the basket with a metal load, filling the vessel with an appropriate amount of solution, immersing the metal load in the solution placed in the vessel, and allowing metal ions to be leached from the metal into the solution.

In some embodiments, one metal or one type of substantially pure metal load may be loaded into the basket. In some embodiments, the one metal or one type of substantially pure metal is copper. In some embodiments, more than one metal or more than one type of substantially pure metal load may be loaded into the basket.

In some embodiments, the metal loaded into the basket has dimensions to increase solution-to-metal-surface-are contact. In some embodiments, the metal loaded into the basket is metal strips. In some embodiments, the metal is loaded into the basket between pairs of spacers so that one or zero pieces of metal are loaded between each pair of spacers in the basket.

In embodiments, an appropriate amount of metal is loaded into the basket to produce a suspension with a predetermined metal ion concentration. In some embodiments, additional metal is loaded into the basket to increase the amount of metal ions leached in the solution. In some embodiments, less metal is loaded into the basket to decrease the amount of metal ions leached into the solution.

In embodiments, an appropriate amount of solution is placed in the vessel to produce a suspension with a predetermined metal ion concentration. In embodiments, the amount of solution placed in the vessel will define a solution depth below which the basket and its metal load is submerged in the solution. In some embodiments, the volume of solution placed in the vessel may be substantially equal to the volume of the vessel. In some embodiments, the volume of solution placed in the vessel will be substantially less than the volume of the vessel. In some embodiments, additional solution is placed in the vessel to decrease the concentration of the metal ions leached into the solution. In some embodiments, less solution is placed in the vessel to increase the concentration of the metal ions leached into the solution.

In some embodiments, the solution is buffered. In some embodiments, the buffer comprises at least one of acetate, acetic acid, phosphate, a phosphoric acid, or at least one salt of acetate, acetic acid, phosphate, or phosphoric acid. In some embodiments, the solution requires no buffer, or the solution is substantially free of buffers or buffering agents. In some embodiments, the solution is a saline solution.

In embodiments, the basket containing its metal load is disposed in the vessel into which the solution is placed. In some embodiments, the basket and its metal load are fully submerged in the solution placed in the vessel. In some embodiments, the basket and its metal load are partially submerged in the solution placed in the vessel.

In some embodiments, the basket and its metal load are disposed in the vessel for a predetermined time between about 0.5 hours and several days (e.g., 1, 2, 3, 4, 5, 6, 7, or 10 days), several weeks (e.g., 1, 2, 3, 4, 5, or 6 weeks), or several months (e.g., 1, 2, 3, 4, 5, 6, or 12 months). In some embodiments the predetermined time is between about 0.5 hours and about 72 hours. In some embodiments, the time is about 0.5, about 1, about 1.5, about 2, about 2.5, about 3, about 4, about 5, about 6, about 12, about 18, about 24, about 36, about 48, about 60, or about 72 hours.

In some embodiments, the method further comprises heating or cooling the solution to a predetermined temperature while the basket and its metal load is disposed in the vessel. In some embodiments, the solution is heated to a temperature of about 37° C. and held at about 37° C. for a predetermined period of time. In some embodiments, the solution is heated to a temperature of about 50° C. and held at about 50° C. for a predetermined period of time. In some embodiments, the solution is held at room temperature for a predetermined period of time.

In some embodiments, the method further comprises agitating at least one of the basket, the vessel, and the solution while the basket and its metal load are disposed in the vessel. In some embodiments, the solution is circulated in the vessel independently of agitating the vessel or basket. In some embodiments, at least one of the vessel and the basket are shaken or rocked. In some embodiments, the basket is lifted and lowered into the vessel.

In some embodiments, the basket and the remaining metal load is removed from the vessel after a predetermined time. In some embodiments, the remaining metal removed from the vessel is measured. In some embodiments, the amount of metal ion leached into the solution is measured.

In some embodiments, the basket and the remaining metal load may be re-immersed in the vessel and solution after it is removed. In some embodiments, the basket and the remaining metal load is immersed in the same or another vessel into which another solution has been placed.

In some embodiments, precipitate is removed from the suspension comprising metal ions. In some embodiments, the suspension comprising metal ions is filtered.

In some embodiments, the concentration of the metal ions in the suspension comprising metal ions are increased. In some embodiments, the concentration of metal ions in the suspension comprising metal ions are increased by repeating the method with at least one new or additional metal load. In some embodiments, the ion concentration is increased by adding additional metal to the metal load. Any appropriate amount of additional metal may be added to the metal load. For instance, an additional load of metal substantially equal to the initial load of metal may be added to double the metal load, or an additional load of metal substantially equal to half the initial load of metal may be added to increase the metal load by 50%. In some embodiments, metal is added by adding additional sheets of metal, each sheet being substantially equal to the other sheets. For example, an initial metal load of 47 substantially equal metal sheets, such as copper, may be increased about 62% by adding 29 additional metal sheets.

In some embodiments, the concentration of metal ions in the suspension comprising metal ions are increased by evaporating liquid away from the suspension comprising metal ions. In some embodiments, liquid in the suspension comprising metal ions is evaporated away to an extent that the remaining product is a powder. Such powders may be dry or may be substantially free of liquid. In some embodiments where a powder is produced, the powder may have the same mass or substantially the same mass as the mass of the initial metal load. In some embodiments where a powder is produced, the powder may have more mass than the initial metal load. In some embodiments where a powder is produced, the powder will have less mass than the initial metal load. In some embodiments, a second solution or suspension may be added to the powder, and the powder may be resuspended in the second solution or suspension to produce a further suspension comprising metal ions. In some embodiments, the second solution or suspension and the powder is agitated or shaken in order to resuspend the powder.

In some embodiments, the concentration of the metal ions in the suspension comprising metal ions is decreased. In some embodiments, the concentration of metal ions in the suspension comprising metal ions are decreased by adding at least one liquid to the suspension comprising metal ions. In some embodiments, the at least one liquid added to the suspension comprising metal ions may be substantially identical to the solution placed into the vessel before the metal ions were leached into the solution.

In some embodiments, the concentration of the metal ions in the suspension comprising metal ions is adjusted by adding another suspension comprising metal ions with a different concentration.

In some embodiments, the method may further comprise the step of combining a suspension comprising metal ions may with various carriers. In some embodiments, the carrier may be creams, lotions, gels, foams, pastes, other solutions, tampons, suppositories, body wipes, wound dressings, skin patches or suture material to obtain other forms of metal ion treatments.

Some embodiments of the present disclosure pertain to a system used to produce a suspension comprising copper ions. Some embodiments of the present disclosure pertain to a method to produce a suspension comprising copper ions.

In certain embodiments, the suspension comprising metal ions may be further modified to supply a pharmaceutically acceptable treatment.

BRIEF DESCRIPTION OF THE FIGURES

FIG. 2A is a cross-sectional view of the basket, and FIG. 2B is an overhead view. The exemplary basket is a cylindrical basket having a flat bottom defining openings to allow liquids to pass freely into and out of the basket and a solid wall defining an inner-diameter of the basket. FIGS. 2B and 2C depict the baskets spacers which allow the metal load of the basket to be placed into the basket with reduced contact between individual pieces of the metal load. The basket also has a handle for ease of disposing and extracting the basket from an appropriate vessel of the system. The handle is configured so as to not interfere with the placement of the metal load.

FIG. 3 displays an exemplary embodiment of the system. The vessel of the system is a cylindrical, curved-bottom vessel. The basket of the system is disposed in the vessel such that its copper load is partially submerged in the solution contained within the vessel.

FIG. 4 displays an exemplary embodiment of the system. The vessel of the system is a cylindrical, flat-bottom vessel. The basket of the system is disposed in the vessel such that its copper load is fully submerged in the solution contained within the vessel.

DETAILED DESCRIPTION OF EMBODIMENTS

System

The technology includes a system comprising a basket and a vessel to provide a metal-ion composition.

Basket and Metal Load

Figure 2A:
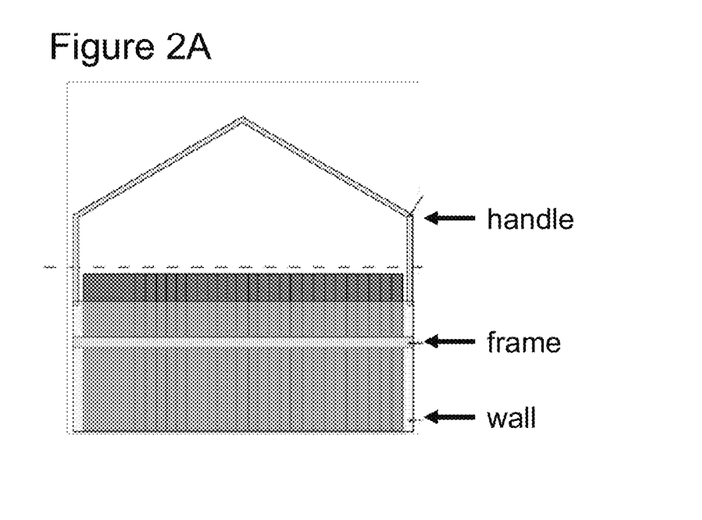
FIGS. 2A, 2B, and 2C display an exemplary basket of the system.
Figure 2B:
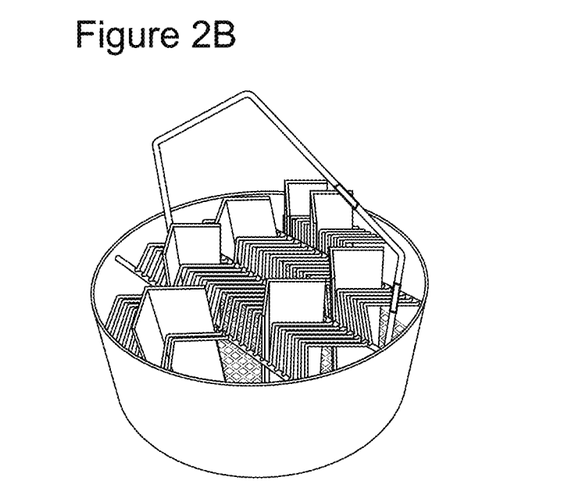
Figure 2C:
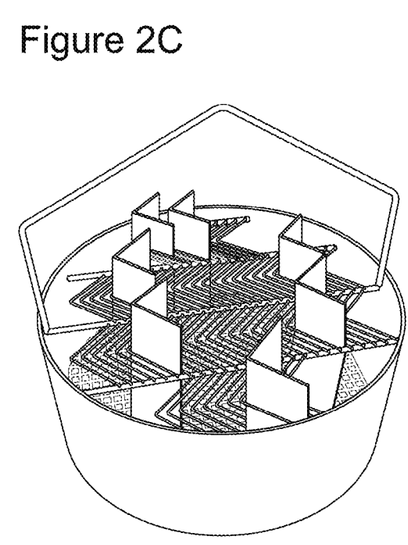

The basket of the system comprises a base. The base comprises a floor and at least one wall defining the perimeter of the basket (FIGS. 2A-2C). The base may have any dimensions such that it may be disposed and removed from the vessel of the system. The base may be cylindrical, rectangular, cubic, triangular, octagonal, tetrahedral, conic, pyramidic, near-spherical, or an irregular shape.

The basket may be composed of any appropriate material. Appropriate materials may include plastics, glasses, cloths, or inert metals. Inert metals refer to any metal or metal composite which is substantially not reactive with a solution placed in the vessel of the system. In one embodiment, the inert metal is stainless steel. In one embodiment, the inert metal is a medical grade stainless steel, such as 316 stainless steel.

The floor is not impermeable to liquids including a solution within the vessel of the system or metal ions leached from the metal load of the basket and disposed in the solution within the vessel. The floor may be made of interwoven or welded wires (FIG. 2C). The wires may be positioned such that the space between the wires provides access to liquids into and out of the basket through the floor. Other floors envisioned include floors made of a single piece of a material, the single piece of material defining one or more apertures through which a solution could pass, multiple pieces defining one or more apertures through which a solution could pass (e.g. in a concentric ring formation), and a material possessing an exclusion diameter, whereby objects larger than the exclusion diameter are unable to pass through the material but other objects smaller than the exclusion diameter are free to pass through the material. The free flow of the solution will permit insoluble products to concentrate upon the bottom of the vessel.

The at least one wall defines the perimeter of the base. It may run along the outer edge of the floor. It may run from the floor to the height of the basket. Alternatively, it may be positioned above the floor of the basket. Alternatively, it may be positioned below the height of the basket. Alternatively, it may be placed above the floor of the basket and below the height of the basket. In one embodiment, the at least one wall may comprise more than one piece of material. The more than one piece of material comprising the at least one wall may be flush against one another. Alternatively, the more than one piece of material comprising the at least one wall may be spaced apart from one another, thereby defining a gap, a space, a slit, or an aperture through which a liquid may flow.

The basket of the system may comprise a handle attached to its base. The handle may be welded into the inside wall of the basket system's base. The handle will be positioned in such a manner as to not interfere with the metal load in the basket.

The basket of the system may comprise a frame. The frame may comprise one or more separators which the metal load may rest upon or may otherwise be used to separate various components from the metal load from other components of the metal load. The frame may be placed roughly two-thirds up the height of the basket base. For example, a basket base with a height of about 15 cm may include a frame placed at about 12 cm above the bottom of the basket base.

The basket of the system may comprise one or more spacer. The one or more spacers allow the metal load of the basket to be placed into the basket with reduced contact between individual pieces of the metal load and/or the materials of the basket. In some embodiments, the one or more spacer may run from one side of the basket's perimeter to another side of the basket's perimeter. In some embodiments, the spacers may be attached to the basket's at least one wall at one or both ends. In some embodiments, a series of spacers running from one side of the basket's perimeter to another side of the basket's perimeter and attached to the basket's at least one wall at one or both ends define a series of slits, spaces, or gaps (FIGS. 2B-2C). Additional buttresses may be provided to supply additional support to the spacers. One or more piece of metal from the basket's metal load may be placed into at least one or more of these defined slits, spaces, or gaps.

In an embodiment comprising a plurality of spacers, at least one spacer may run parallel to at least one other spacer. In an embodiment comprising a plurality of spacers, at least one spacer may not run parallel to at least one other spacer, and the at least one spacer will not make contact with the at least one other spacer. For example, at least one spacer may run from one end of the basket's perimeter to another end of the basket's perimeter making a v-wave, and at least one other spacer may also run from one end of the basket's perimeter to another end of the basket's perimeter also making a v-wave, but the at least one spacer and the at least one other spacer do not come into contact (FIGS. 2B-2C).

Vessel

The vessel of the system comprises a bottom and at least one wall defining the perimeter of the vessel. The vessel may have any dimensions such that the basket of the system may be partially or fully disposed and removed from the vessel. The vessel may be cylindrical, rectangular, cubic, triangular, octagonal, tetrahedral, conic, pyramidic, near-spherical, or an irregular shape.

The bottom and at least one wall of vessel are solid, and the vessel is capable of holding a solution. The vessel may be composed of any appropriate material. Appropriate materials may include plastics, glasses, or inert metals. Inert metals refer to any metal or metal composite which is substantially not reactive with a solution placed in the vessel of the system. In one embodiment, the inert metal is stainless steel. In one embodiment, the inert metal is a medical grade stainless steel, such as 316 stainless steel.

The top of the vessel may be open. Alternatively, the top of the vessel may be a lid which is capable of being opened or closed.

Flat-Bottom Vessels

Figure 1A:
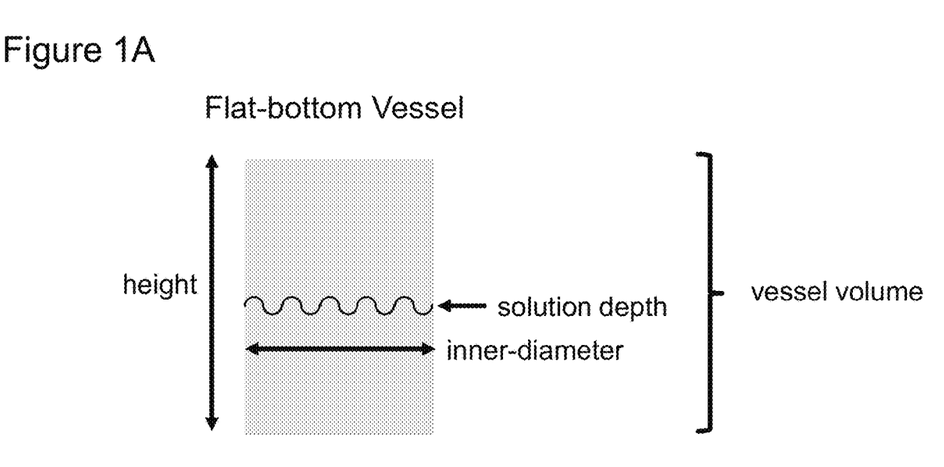
FIG. 1A displays a flat-bottom embodiment of the vessel of the system. The flat-bottom vessel displayed is a cylindrical vessel with a flat bottom and open top. The inner-diameter of the vessel is d, the height of the vessel is h, and the volume of vessel is V. The solution depth is defined by the amount of solution contained in the vessel and is the height within the vessel below which the contents of the vessel are fully submerged.

The vessel of the system may have a flat bottom (FIG. 1A). The vessel further comprises one or more walls defining the shape of the vessel.

These vessels may be of any shape with a flat bottom including rectangular, cubic, triangular, octagonal, tetrahedral, cylindrical, conic, pyramidic, near-spherical, or an irregular shape with a flat bottom. Preferred embodiments of the vessel are cylindrical (FIG. 1A). The interior of the vessel is a cavity defined by the walls and bottom of the vessel.

The inner-diameter (d) of the vessel may be any inner-diameter such that the basket of the system and its metal load can be disposed and removed from the vessel. The height (h) of the vessel may be any height such that the basket of the system and its metal load is fully or partially submerged in a solution contained in the vessel.

The vessel volume (V) of the vessel is the volume of the vessel's cavity defined by the walls and bottom of the vessel. This volume may be approximated by well-known mathematical equations. The vessel volume of the vessel may be any vessel volume such that a solution contained in the vessel may fully or partially submerge the basket of the system and its metal load disposed in the vessel.

The amount of solution contained in the vessel will define a solution depth. The solution depth is the height within the vessel below which the contents of the vessel are fully submerged. The solution depth of a vessel may be any solution depth greater than about zero and less than or equal to about the height of the vessel. In some embodiments the solution depth is about half the height of the vessel. The solution depth may be defined as the height within the vessel below which the contents of the vessel are fully submerged while the vessel contains only the solution and is otherwise empty. Alternatively, the solution depth may be defined as the height within the vessel below which the contents of the vessel are fully submerged while the vessel contains the solution and the basket of the system. Alternatively, the solution depth may be defined as the height within the vessel below which the contents of the vessel are fully submerged while the vessel contains the solution, the basket of the system, and the basket's metal load. Generally, the solution depth in a vessel may be approximated by well-known mathematical calculations.

Round-Bottom Vessels

Figure 1B:
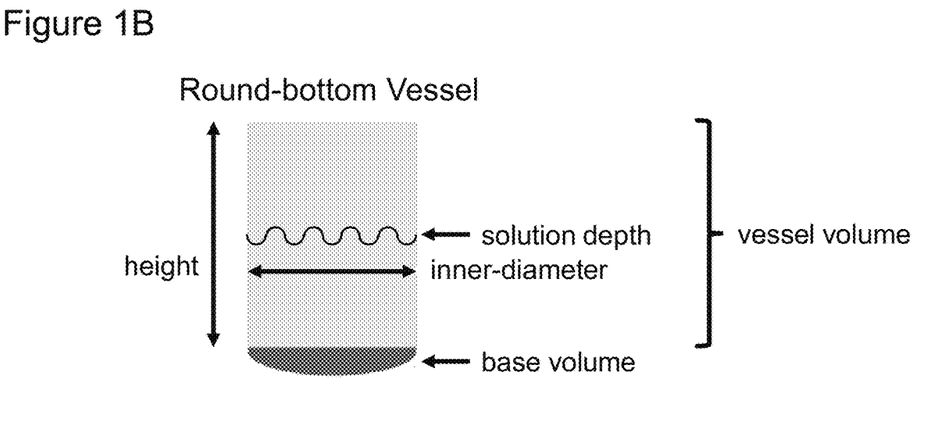
FIG. 1B displays a curved-bottom embodiment of the vessel of the system. The curved-bottom vessel displayed is a cylindrical vessel with a curved bottom and open top. The curved-bottom vessel has an inner-diameter (d), a height (h), and a vessel volume (V). The solution depth of the curved-bottom vessel is defined by the amount of solution in the vessel and is the height within the vessel below which the contents of the vessel are fully submerged.

The vessel of the system may have a curved bottom (FIG. 1B). The vessel comprises one or more walls defining the shape of the vessel. One or more of the walls of the vessel may share the same surface as the curved bottom. Alternatively, all of the walls of the vessel may be distinguishable from the curved bottom.

These vessels may be of any shape with a curved bottom including rectangular, cubic, triangular, octagonal, tetrahedral, cylindrical, conic, pyramidic, near-spherical, spherical, or an irregular shape with a curved bottom. Preferred embodiments of the vessel are cylindrical with a curved bottom (FIG. 1B). The interior of the vessel is a cavity defined by the walls and the bottom of the vessel.

A curved-bottom vessel has an inner-diameter (d) and a height (h). The inner-diameter may be any inner-diameter such that the basket of the system and its metal load can be disposed and removed from the vessel. The height may be any height such that the basket of the system and its metal load is fully or partially submerged in a solution contained in the vessel The vessel volume (V) of the vessel is the volume of the vessel's cavity defined by the walls and bottom of the vessel. The volume may be approximated by well-known mathematical equations. This approximation of the vessel volume may include the base volume defined by the curved bottom. The approximation of the vessel volume may not include the base volume defined by the curved bottom. The vessel volume of the vessel may be any vessel volume such that a solution contained in the vessel may fully or partially submerge the basket of the system and its metal load disposed in the vessel.

The amount of solution contained in the vessel will define a solution depth. The solution depth is the height within the vessel below which the contents of the vessel are fully submerged. The solution depth in a curved-bottom vessel may be measured from the bottom of the non-curved-base portion of the vessel, above the curved base. Alternatively, the solution depth may be measured from the bottom of the curved base. The solution depth of a vessel may be any solution depth greater than about zero and less than or equal to about the height of the vessel. In some embodiments the solution depth is about half the height of the vessel. The solution depth may be defined as the height within the vessel below which the contents of the vessel are fully submerged while the vessel contains only the solution and is otherwise empty. Alternatively, the solution depth may be defined as the height within the vessel below which the contents of the vessel are fully submerged while the vessel contains the solution and the basket of the system. Alternatively, the solution depth may be defined as the height within the vessel below which the contents of the vessel are fully submerged while the vessel contains the solution, the basket of the system, and the basket's metal load. Generally, the solution depth in a vessel may be approximated by well-known mathematical calculations.

Solution

The solution may be any solution capable of leaching metal ions from a solid piece of metal disposed in the solution over time. The solution may be buffered by any buffer known in the art. For example, the solution may be buffered with acetate, acetic acid, phosphate, a phosphoric acid, any salts of the buffers, or any combination of the buffers. In some embodiments, the solution requires no buffer, or the solution is substantially free of buffers or buffering agents. The solution may further comprise a dissolved salt. For example, the solution may comprise sodium chloride and thereby be a saline solution. In some embodiments, the solution is a saline solution. In some embodiments, the saline solution uses any appropriate saline dissolved in the solution. The solution may be of any appropriate pH, such as a pH of about 5.0. In some embodiments, the solution has a pH between about 4.7 and about 7.

The solution is not required to fill the otherwise empty vessel. Nor is the solution required to fill the vessel when the basket of the system is in the vessel. Nor is the solution required to fill the vessel when the basket of the system and its metal load are in the vessel.

Additional Components

It is envisioned that the system may benefit from the addition of further components.

In preferred embodiments, the system comprises a temperature control element configured to heat, cool, or maintain the temperature of the solution placed in the vessel. The temperature control element may be configured to heat the solution to a temperature between about 35° C. to about 100° C. Preferably, the temperature control element may be configured to heat the solution to a temperature between about 35° C. and 70° C. In one embodiment, the temperature control element is configured to heat the solution to a temperature of about 37° C. and maintain the temperature of the solution at about 37° C. for a predetermined period of time. In another embodiment, the temperature control element is configured to heat the solution to a temperature of about 50° C. and maintain the temperature of the solution at about 50° C. for a predetermined period of time. In another embodiment, the solution is held at room temperature for a predetermined period of time.

The system may comprise an agitation element configured to agitate at least one of the basket, the vessel, and the solution. In one embodiment, the agitation element is configured to circulate the solution in the vessel independently of agitating the vessel or basket. In one embodiment, the agitation element is configured to shake or rock at least one of the vessel and the basket. In one embodiment, the agitation element is configured to lift and lower the basket in the vessel.

Process

The technology includes a process of using a basket, a vessel, a solution, and a metal load to produce a metal-ion composition.

Loading the Basket

At least one appropriate metal is loaded into the basket of the system. Appropriate metals are any metals which it is desirable to leach metal ions from. For example, copper may be an appropriate metal when the solution to be produced is to comprise copper ions. The at least one appropriate metal may comprise metals of different type (e.g. a copper metal and a silver metal). The at least one appropriate metal may comprise metals of different purity (e.g. a pure copper metal and a metal which is 90% or more copper). Appropriate metals are not inactive with respect to the solution used in the process.

The metal is preferably loaded so as to provide a substantial amount of metal surface area to be in contact with the solution when the basket is submerged into the vessel. By providing a substantial amount of metal surface area to be in contact with the solution, the rate of metal ion leaching will be increased. In some embodiments, the metal is loaded into the basket so that its longest dimension is its height. In some embodiments, the metal is loaded into the basket so that its longest dimension is its length. In some embodiments, the metal is a strip of metal.

In some embodiments where the basket comprises spacers, only one piece of metal is placed between a pair of spacers. In some embodiments, a plurality of pieces of metal are placed between a pair of spacers.

An appropriate amount of metal is placed in the basket. An appropriate amount of metal is any amount of metal which, when submerged in the solution in the vessel for an appropriate amount of time at an appropriate temperature, will produce a solution with a concentration of metal ion within a desired range.

In some embodiments, the total metal loaded into the basket may have a mass between about 100 milligrams and about 15 kilograms. For example, the total metal loaded into the basket may have a mass of about 0.1 kilograms, 0.2 kilograms, 0.4 kilograms, 0.6 kilograms, 0.8 kilograms, 1 kilogram, 1.2 kilograms, 1.4 kilograms, 1.6 kilograms, 1.8 kilograms, 1.9 kilograms, 2.1 kilograms, 2.3 kilograms, 2.5 kilograms, 2.7 kilograms, 2.9 kilograms, 3.1 kilograms, 3.3 kilograms, 3.5 kilograms, 4 kilograms, 5 kilograms, 6 kilograms, 7 kilograms, 8 kilograms, 9 kilograms, 10 kilograms, 12.25 kilograms, 14 kilograms, or 15 kilograms. In some embodiments, the total metal loaded into the basket may have a mass of more than about 15 kilograms. In some embodiments, the total metal loaded into the basket may have a mass of less than about 100 milligrams.

An aspect of the present technology is that the amount of metal loaded into the basket may be increased to increase the metal-to-solution ratio when the basket is disposed into the vessel of the system, thereby increasing the concentration of the metal ion in the suspension comprising metal ions. Another aspect of the present technology is that amount of metal loaded into the basket may be decreased to decrease the metal-to-solution ratio when the basket is disposed into the vessel of the system, thereby decreasing the concentration of the metal ion in the suspension comprising metal ions.

Filling the Vessel with Solution

Figure 3:
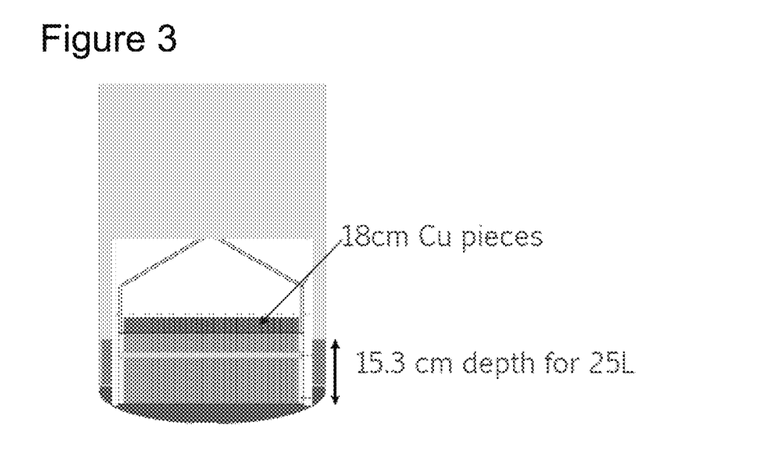
Figure 4:
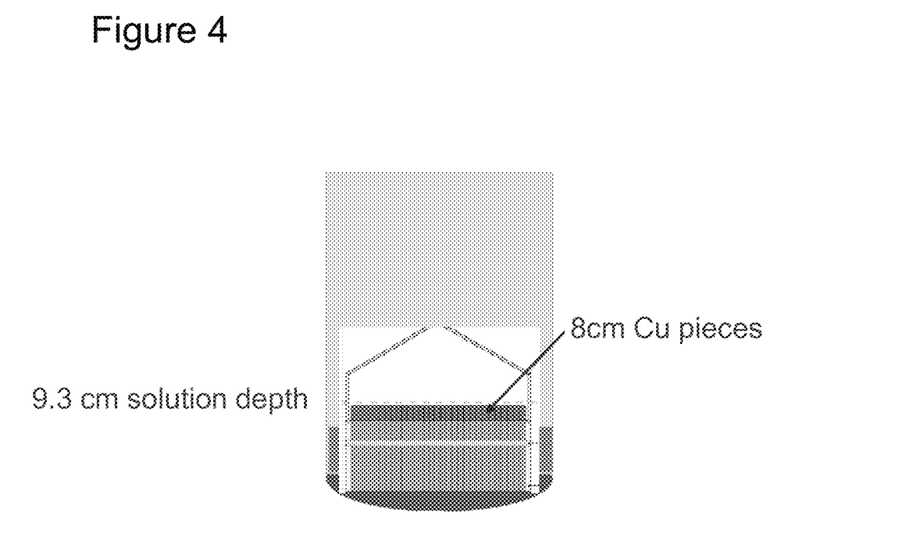

An appropriate amount of solution is placed in the vessel. An appropriate amount of solution is any amount of solution which, when the basket with the metal load is disposed into the vessel is fully or partially submerged. That is, an appropriate amount of solution will define a solution depth within the vessel which is partially or fully above the basket and its metal load once the basket and its metal load is disposed into the vessel. For example, FIG. 3 depicts an embodiment of the presented technology where the volume of the solution is sufficient to define a solution depth of 15.3 centimeters. The metal load in the basket is 18 centimeters in height. Therefore, the solution covers the basket and its metal load up to 15.3 centimeters high while the basket and its metal load is disposed into the vessel containing the solution. Additionally, FIG. 4 depicts a preferred embodiment of the present technology where the solution is sufficient to define a solution depth greater than the height of the basket with its metal load. In such embodiments, the solution completely covers the base of the basket and its metal load such that the metal load is fully submerged in the solution. In preferred embodiments, the handle of the basket is substantially unsubmerged or is not fully submerged in the solution.

The volume of solution placed in the vessel may be any volume greater than zero milliliters and less than or about equal to the volume of the vessel. The volume of solution placed in the vessel may be substantially equal to the volume of the vessel in the absence of the basket of the vessel and the metal load loaded into the basket. The volume of the solution placed in the vessel may be substantially equal to the volume of the vessel in the absence of the metal load less the volume excluded by the basket. The volume of the solution placed in the vessel may be substantially equal to the volume of the vessel less the volume excluded by the basket and the metal load loaded into the basket.

For example, the volume of the solution to be placed into the vessel may be between about 200 milliliters and about 65 liters. In some embodiments, the volume of the solution placed in the vessel may be about 52.6 liters. In some embodiments the volume of the solution placed in the vessel is about 62.3 liters. In some embodiments the solution volume placed in the vessel is about 25 liters.

An aspect of the present technology is that the amount of solution placed into the vessel may be increased to decrease the metal-to-solution ratio when the basket with its metal load is disposed into the vessel of the system, thereby decreasing the concentration of the metal ion in the suspension comprising metal ions. Another aspect of the present technology is that amount of solution placed into the vessel may be decreased to increase the metal-to-solution ratio when the basket with its metal load is disposed into the vessel of the system, thereby increasing the concentration of the metal ion in the suspension comprising metal ions.

The solution may be any solution capable of leaching metal ions from a solid piece of metal disposed in the solution over time. The solution may be buffered by any buffer known in the art. For example, the solution may be buffered with acetate, acetic acid, phosphate, a phosphoric acid, any salts of the buffers, or any combination of the buffers. In some embodiments, the solution requires no buffer, or the solution is substantially free of buffers or buffering agents. The solution may further comprise a dissolved salt. For example, the solution may comprise sodium chloride and thereby be a saline solution. In some embodiments, the solution is a saline solution. In some embodiments, the saline solution uses any appropriate saline dissolved in the solution. The solution may be of any appropriate pH, such as a pH of about 5.0. In some embodiments, the solution has a pH between about 4.7 and about 7.

In preferred embodiments, the temperature of the solution is controlled by any tools known in the art. The temperature of the solution may be room temperature (about 20-21° C.). Alternatively, the solution may be heated to a temperature between about 35° C. to about 100° C. In one embodiment, the solution is heated to a temperature of about 37° C. and held at about 37° C. for a predetermined period during which the basket and its metal load are partially or fully submerged in the solution. In another embodiment, the solution is heated to a temperature of about 50° C. and held at about 50° C. for a predetermined period of time during which the basket and its metal load are partially or fully submerged in the solution.

An aspect of the present technology is that the temperature of the solution may be adjusted to speed up or slow down the rate metal ions are leached into the solution while the basket and its metal load is fully or partially submerged in the solution compared with the rate metal ions are leached into the solution when the temperature of the solution is about room temperature. In preferred embodiments, the solution is heated to a temperature above that of room temperature so as to speed up the rate at which metal ions are leached into the solution. In preferred embodiments, the temperature of the solution is held at a temperature above that of room temperature for a predetermined period during which the basket and its metal load are partially or fully submerged in the solution so as to speed up the rate at which metal ions are leached into the solution.

Disposing the Basket and Metal Load in the Vessel and Submerging the Metal Load in the Solution The basket containing its metal load is disposed into the vessel into which the solution is placed such that the solution depth is above the bottom of the basket. That is the basket is partially or fully submerged in the solution.

An aspect of the disclosed technology is that the basket containing its metal load may be disposed in the vessel and be partially or fully submerged in the solution for a predetermined period of time in order to promote the leaching of metal ions from the metal into the solution. The time during which the basket may be disposed in the vessel and be partially or fully submerged in the solution may be any appropriate time that allows for a desired amount of metal ions to be leached from the metal into the solution. In some embodiments of the technology the time is between about 0.5 hours and several days (e.g., 1, 2, 3, 4, 5, 6, 7, or 10 days), several weeks (e.g., 1, 2, 3, 4, 5, or 6 weeks), or several months (e.g., 1, 2, 3, 4, 5, 6, or 12 months). In some embodiments the predetermined time is between about 0.5 hours and about 72 hours. In some embodiments, the time is about 0.5, about 1, about 1.5, about 2, about 2.5, about 3, about 4, about 5, about 6, about 12, about 18, about 24, about 36, about 48, about 60, or about 72 hours.

In preferred embodiments, the temperature of the solution is controlled while the basket and its metal load are partially or fully submerged in the solution by any tools known in the art. In one embodiment the temperature of the solution is maintained at room temperature while the basket and its metal load are partially or fully submerged in the solution. In another embodiment, the temperature of the solution is maintained at a temperature between about 35° C. to about 70° C. while the basket and its metal load are partially or fully submerged in the solution. In another embodiment, the temperature of the solution is maintained at a temperature between about 37° C. to about 50° C. while the basket and its metal load are partially or fully submerged in the solution. The temperature of the solution may be adjusted to a temperature above that of room temperature and that temperature may be maintained while the basket and its metal load is partially or fully submerged in the solution.

During the time that the basket and its metal load is disposed in the vessel the vessel, the solution, the basket and its metal load, or a combination of any components of the system may be agitated. This agitation may be provided by any means known in the art and may include circulating the solution in the vessel independently of agitating the vessel or basket, shaking or rocking at least one of the vessel and the basket, lifting and then re-lowering the basket into the vessel. An aspect of the technology is that any appropriate amount of agitation may be provided increased metal surface-to-solution contact, and/or increase the rate of leaching metal ions from the metal, and/or increase the amount of metal ions leached from the metal into the solution, and/or decrease the period of time during which the basket and its metal load are disposed in the solution within the vessel.

After the predetermined time the basket and the remaining metal load is removed from the vessel and the solution. The amount of metal ions leached from the metal may be calculated using well-known methods. Methods to estimate the amount of metal ions leached from the metal may be calculated by comparing the mass of the metal load after removal to the mass of the metal load before it was disposed in the vessel and the solution. The amount of metal ions in the solution may be determined using, for example, mass spectrometry (e.g. inductively coupled plasma mass spectrometry, ICP-MS). The removed metal load may be re-immersed in the solution if it is desired that further metal ions be leached from the metal load. Alternatively, the metal load may be immersed in a separate solution.

After the basket and the metal load is removed, precipitate in the solution may be removed by use of a filter or any other method known in the art. Alternatively, the precipitate may be retained in the solution or resuspended by agitation or shaking. In some embodiments, the suspension comprising metal ions is agitated or shaken for about 15 seconds to suspend metal ions in the suspension comprising metal ions.

The concentration of metal ions in the suspension may be adjusted by methods known in the art. For example, additional liquids may be added to the suspension comprising leached metal ions thereby diluting the final concentration of the metal ions in the suspension. The liquid could be any liquid including water, a liquid with a composition identical to the solution before the metal ions were leached into the solution, or another suspension comprising metal ions. Alternatively, the suspension may be treated with appropriate air pressure and/or heat to evaporate liquid from the suspension thereby concentrating the final concentration of the metal ions in the suspension. In some embodiments, liquid in the suspension comprising metal ions is evaporated away to an extent that the remaining product is a powder. Such powders may be dry or may be substantially free of liquid. In some embodiments where a powder is produced, the powder may have the same mass or substantially the same mass as the mass of the initial metal load. In some embodiments where a powder is produced, the powder may have more mass than the initial metal load. In some embodiments where a powder is produced, the powder will have less mass than the initial metal load. In some embodiments, a second solution or suspension may be added to the powder, and the powder may be resuspended in the second solution or suspension to produce a further suspension comprising metal ions. In some embodiments, the second solution or suspension and the powder is agitated or shaken in order to resuspend the powder. Alternatively, another suspension comprising metal ions at a higher concentration could be added to the suspension comprising metal ions to increase the final concentration of the metal ions compared to the suspension comprising metal ions.

A suspension with a desired concentration of metal ions may be mixed with various carriers to facilitate application or delivery of the suspension comprising metal ions. Suitable carriers include creams, lotions, gels, foams, pastes, other solutions, tampons, suppositories, body wipes, wound dressings, skin patches and suture material to obtain other forms of metal ion treatments. The carriers may comprise other active components or consist only of non-active components. The resulting compounds may be used as treatments for use on anatomical tissue of the genital-rectal areas, the oral-respiratory-otic areas, and/or the dermatological areas of the body.

EXAMPLES

The following specific examples are to be construed as merely illustrative, and not limitative of the remainder of the disclosure in any way whatsoever. Without further elaboration, it is believed that one skilled in the art can, based on the description herein, utilize the present disclosure to its fullest extent.

Example 1

A cylindrical, flat-bottom vessel was produced (FIG. 1A). The vessel has a height of 40.6 centimeters, an inner-diameter of 40.6 centimeters, and a vessel volume of 52.6 liters. 25 liters of a solution was placed into the vessel, defining a volume depth of 19.3 centimeters.

Example 2

A cylindrical, round-bottom vessel was produced (FIG. 1B). The vessel has a height of 38 centimeters, an inner-diameter of 45.7 centimeters, and a vessel volume of 62.3 liters excluding the base volume. An amount sufficient to fill the base volume and 25 liters of a solution was placed into the vessel, defining a volume depth of 15.3 centimeters.

A cylindrical basket with a wired bottom was produced (FIGS. 2A-2C). The basket base has a height of 15 centimeters and a diameter of 39.33 centimeters. The basket has a series of spacers in a v-formation (FIGS. 2B-2C). Copper pieces with heights of 18 centimeters were loaded into the basket so that one or no copper piece was positioned between each pair of spacers. The basket with the copper metal load was inserted into the vessel so that the lower 15.3 centimeters of the basket and its copper load were submerged in the solution. The copper metal load and the basket were disposed in the vessel for a predetermined period of time to permit copper ions to leach into the solution.

Example 3

A cylindrical, flat-bottom vessel was produced. Sufficient solution was placed into the vessel to define a volume depth of about 19.3 centimeters. A cylindrical basket with a wired bottom was produced. The basket was loaded with copper metal with heights of about 18 centimeters. The basket with the copper metal load was inserted into the vessel so that all of the copper was fully submerged in the solution (FIG. 4). The copper metal load and the basket were disposed in the vessel for a predetermined period of time to permit all of the copper ions to leach into the solution.

Example 4

A metal load comprising 8 copper metal strips was provided. The copper metal was fully submerged into 1 liter of leaching solution, and the copper ions in the copper metal load were leached into the solution at 37° C. After about 24 hours, the remaining solid copper was removed from the solution. The 1 liter suspension comprising copper metal ions was concentrated by evaporating away liquid from the suspension comprising copper metal ions to an extent that a powder was produced. This powder was substantially free of liquid. It was determined that its mass was 0.71 grams. 30 grams of a suspension consisting of 46 m/mL of copper in 0.9% saline with 0.8 g/L $NaPO_4$ (3VM1000) were added to the powder, and the powder was resuspended in the suspension by agitation. 70 grams of VersaBase® cream made by Professional Compounding Centers of America (PCCA) of Houston, Tex. was added to the suspension comprising the resuspended powder and thoroughly mixed. The resulting cream composition comprised about 590 μg of copper ions per gram of composition.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

The invention claimed is:

1. A system for producing a suspension comprising metal ions, the system comprising:
   a. a basket, the basket comprising a base comprising a floor permeable to a solution and metal ions and at least one wall, and
   b. a vessel;
   wherein the basket is configured to be loaded with one or more pieces of metal on its base, wherein the vessel is configured to hold the solution, wherein the solution is a saline solution, and wherein the basket and the vessel are configured for the basket to be disposed in the vessel such that the one or more metal pieces loaded into the basket are fully or partially submerged in the saline solution placed in the vessel and ions are leached from the one or more metal pieces into the saline solution to provide a suspension comprising metal ions.

2. The system of claim 1 wherein the basket comprises one or more pairs of spacers.

3. The system of claim 1 wherein the vessel has a flat bottom or a rounded bottom.

4. The system of claim 1 wherein the vessel and the basket are cylindrical.

5. The system of claim 1 wherein the one or more pieces of metal loaded into the basket are fully submerged in the saline solution placed in the vessel.

6. The system of claim 1 wherein at least one of the vessel and the basket are composed of medical grade stainless steel.

7. The system of claim 1 further comprising a temperature control element configured to heat, cool, or maintain the temperature of the saline solution.

8. The system of claim 1 further comprising an agitation element configured to agitate at least one of the basket, the vessel, and the saline solution.

9. The system of claim 1 wherein at least one of the at least one or more metal pieces loaded into the basket is a copper metal.

10. The system of claim 9 wherein the metal ions are copper ions.

11. The system of claim 1 wherein the saline solution has a pH between about 4.7 and about 7.

* * * * *